United States Patent
Athey et al.

(10) Patent No.: US 8,650,084 B2
(45) Date of Patent: Feb. 11, 2014

(54) TOOL FOR ANALYSIS OF ADVERTISING AUCTIONS

(75) Inventors: Susan Carleton Athey, Cambridge, MA (US); Anton Schwaighofer, Cambridge (GB); Denis Nekipelov, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 12/818,463

(22) Filed: Jun. 18, 2010

(65) Prior Publication Data

US 2011/0313851 A1 Dec. 22, 2011

(51) Int. Cl.
*G06Q 30/00* (2012.01)

(52) U.S. Cl.
USPC .................................. 705/14.71; 705/14.46

(58) Field of Classification Search
USPC ......... 705/14.45, 14.46, 14, 54, 14.55, 14.71, 705/14.41
See application file for complete search history.

(56) References Cited

U.S. PATENT DOCUMENTS

| | | | |
|---|---|---|---|
| 7,430,533 B1 * | 9/2008 | Cushing | 705/37 |
| 7,698,331 B2 | 4/2010 | Carson, Jr. | |
| 2004/0098332 A1 * | 5/2004 | Dvir | 705/37 |
| 2006/0026062 A1 * | 2/2006 | Collins | 705/14 |
| 2006/0026064 A1 | 2/2006 | Collins | |
| 2007/0100738 A1 * | 5/2007 | Mullendore | 705/37 |
| 2008/0275757 A1 | 11/2008 | Sharma | |
| 2009/0138362 A1 * | 5/2009 | Schroedl et al. | 705/14 |
| 2009/0198684 A1 | 8/2009 | Collins | |
| 2011/0191168 A1 * | 8/2011 | Schroedl et al. | 705/14.45 |
| 2011/0225037 A1 * | 9/2011 | Tunca et al. | 705/14.46 |
| 2011/0313851 A1 * | 12/2011 | Athey et al. | 705/14.46 |

FOREIGN PATENT DOCUMENTS

WO  WO 2009/002966 A2  3/2009

OTHER PUBLICATIONS

Athey, Susan and Nekipelov, Denis, "A Structural Model of Sponsored Search Advertising Auctions", Version: Sep. 2009; downloaded Nov. 25, 2012 from http://keystonestrategy.com/publications/.*
Agarwal, N. et al. "Skewed Bidding in Pay Per Action Auctions for Online Advertising"; http://kuznets.harvard.edu/~athey/cpa_draft_aea.pdf; (2008).
Aggarwal, G. et al. "Truthful Auctions for Pricing Search Keywords"; http://citeseerx.ist.psu.edu/viewdoc.download?doi=10.1.1.74.7864&rep=rep1&type=pdf; Mar. 12, 2006.

(Continued)

*Primary Examiner* — Donald L. Champagne
(74) *Attorney, Agent, or Firm* — Dave Ream; Jim Ross; Micky Minhas

(57) ABSTRACT

A tool for off-line experimentation with auction parameters for auctions for an ad space. The tool computes, using historical bid information, values per click to advertisers competing for the ad space. The tool applies a homotopy algorithm, using these values, to predict equilibrium bids based on the values to the advertisers. In computing the equilibrium bids, the bid of each advertiser is assumed to stay fixed over multiple auction cycles, but each advertiser is assumed to face uncertainty about quality scores used by the advertising platform in selecting bids and the rank of their bid with respect to others. The quality scores also are assumed to vary between auctions.

20 Claims, 4 Drawing Sheets

Marginal/Incremental Cost Per Click in NU and SEU Case

(56) References Cited

OTHER PUBLICATIONS

Armstrong, M. et al. "Optimal Multi-Object Auctions"; http://faculty-gsb.stanford.edu/wilson/archive/E542/classfiles/Armstrong_auction.pdf May 1999.

Athey, S. et al. "Identification of Standard Auction Models"; http://www.cramton.umd.edu/workshop/papers/athey-haile-identification-of-standard-auction-models.pdf; Aug. 2000.

Athey, S. et al. "Position Auctions with Consumer Search"; http://kuznets.harvard.edu/~athey/position.pdf ; May 2008.

Athey, S. et al. "Setting the Upset Price in British Columbia Timber Auctions"; http://www.cramton.umd.edu/papers2000-2004/athey-cramton-ingraham-setting-upset-price-in-timber-auctions.pdf; Sep. 12, 2002.

Athey, S. et al. "A Structural Model of Sponsored Search Advertising Auctions" Feb. 2010, pp. 1-66.

Avery, C. et al. "Bundling and Optimal Auctions of Multiple Products"; http://citeseerx.ist.psu.edu/viewdoc/download?doi=10.1.1.121.2124&rep=rep1&type=pdf; (2000).

Boltyanskiy, V.G., et al. "Theory of optimal processes. I. The maximum principle"; http://www.dtic.mil/cgi-bin/GetTRDoc?AD=ADA365900&Location=U2&doc=GetTRDoc.pdf; May 1961.

Borgers, T. et al. "Equilibrium Bids in Sponsored Search Auctions: Theory and Evidence" Sep. 2007; http://econ.lse.ac.uk/staff/mpesend/papers/EquiBids.pdf; Sep. 2007.

Brown, J. et al. "How Much Is a Dollar Worth? Tipping Versus Equilibrium Coexistence on Competing Online Auction Sites"; http://citeseerx.ist.psu.edu/viewdoc/download?doi=10.1.1.121.2124&rep=rep1&type=pdf; Oct. 2005.

Chernozhukov, V. et al. "Parameter set inference in a class of econometric models"; http://elsa.berkeley.edu/users/mjansson/Courses/ECON242_SPRING03/Tamer.pdf; Apr. 2003.

Clarke, E. "Multipart Pricing of Public Goods"; http://bbs.cenet.org.cn/UploadImages/200642020355785817.pdf; (1986).

Cremer, J. et al. "Full Extraction of the Surplus in Bayesian and Dominant Strategy Auctions" Econometrica, 56(6), pp. 1247-1257 (1988).

Edelman, B. et al. "Internet Advertising and the Generalized Second-Price Auction: Selling Billions of Dollars Worth of Keywords"; http://rwj.berkeley.edu/schwarz/publications/gsp051003.pdf; Oct. 2005.

Edelman, B. et al. "Optimal Auction Design and Equilibrium Selection in Sponsored Search"; http://www.hbs.edu/research/pdf/10-054.pdf; (2010).

Edelman, B. et al. "Strategic Bidder Behavior in Sponsored Search Auctions"; http://www.benedelman.org/publications/cycling-060703.pdf; Dec. 24, 2009.

Feldman, J. et al. "Budget Optiization in Search-Based Advertising Auctions"—Published Dated: Jun. 11-15, 2007; http://www.site.uottawa.ca/~ttran/teaching/csi5389/papers/Budget_Optimization.pdf.

Feng, J. "Implementing Sponsored Search in Web Search Engines: Computational Evaluation of Alternative Mechanisms"—Published Date: 2007; http://bear.warrington.ufl.edu.feng.JOC.pdf.

Groves, T., "Incentives in Teams" Econometrica, vol. 41, No. 4, (Jul. 1973), pp. 617-631; http://bbs.cenet.org.en/UploadImages/200642013305286207.pdf.

Haile, P., et al. "Inference with an Incomplete Model of English Auctions"; http://www.econ.vale.edu/~pah29/timber/haile-tamer.pdf (2003).

Hendricks, K. et al. "A Survey of Recent Empirical Work Concerning Auctions" The Canadian Journal of Economics, 28(2), 403-426 (1995).

Hong, H. "Extremum Estimation and Numerical Derivatives"; https://www.utexas.edu/cola/depts/economics/_files/Seminar-Papers/sem20100301.pdf; Sep. 2009.

Imbens, G. et al. "Confidence intervals for partially identified parameters"; http://www.econometricsociety.org/ecta/all/4661-3.pdf Feb. 2004.

Iyengar, G. et al. "Characterizing Optimal Keyword Auctions"; http://citeseerx.ist.psu.edu/viewdoc/download?doi=10.1.1.84.6209& rep=rep1&type=pdf; (2006).

Jeziorski, P. et al. "What Makes Them Click: Empirical Analysis of Consumer Demand for Search Advertising"; http://www.stanford.edu/~isegal/ads.pdf; Jun. 10, 2009.

Krishna, V. "Auction Theory"; http://download-it.org/free_files/Cover,%20Contents%20and%20Copyright-3668118573c36b3bb05e267d72d7f98b.pdf; (2010).

Liu, D. et al. "Ex Ante Information and the Design of Keyword Auctions" Information Systems Research; Articles in Advance, pp. 1-21—Published Dated 2009; http://cism.mccombs.utexas.edu/attachments/138_Ex%20Ante%20Information%20published.pdf.

Lucking-Reiley, D. "Field Experiments on the Effects of Reserve Prices in Auctions: More Magic on the Internet"; http://citeseerx.ist.psu.edu/viewdoc/download?doi=10.1.1.6.4825&rep=rep1&type=pdf; Oct. 1995.

Maskin, E. et al. "Optimal Auctions with Risk Averse Buyers" Econometrica, 52(6), pp. 1473-1518 (1984).

Maskin, E. et al. "Optimal Multi-Unit Auctions" The Economics of Missing Markets, ed. By Frank Hahn (Oxford, U.K.: Oxford University Press) (1989).

McAfee, R. et al. "Extracting the Surplus in a Common Value Auction" Econometrica, vol. 57, No. 6 (Nov. 1989) 1451-1459; https://faculty-gsb.stanford.edu/mcmillan/personal_page/documents/Extracting%20the%20Surplus%20in%20the%20Common-Value%20Auction.pdf.

McAfee, R. et al. "How to Set Minimum Acceptable Bids, with Application to Real Estate Auctions"; http://papers.ssrn.com/sol3/Delivery.cfm/SSRN_ID9007_code020716100.pdf?abstractid=9007&mirid=1; Nov. 2001.

McAfee, R. et al. "Updating the Reserve Price in Common Value Auctions"; http://www.kellogg.northwestern.edu/research/math/papers/977.pdf; Jan. 1992.

Myerson, R. "Optimal Auction Design"; http://citeseerx.ist.psu.edu/viewdoc/download?doi=10.1.1.116.6272&rep=rep1&type=pdf Feb. 1981.

Newey, W. et al. "Large Sample Estimation and Hypothesis Testing"; http://www.econ.brown.edu/fac/Frank_Kleibergen/ec266/chap36neweymacfadden.pdf; (1994).

Ostrovsky, Michael et al., "Reserve Prices in Internet Advertising Auctions: A Field Experiment" Dec. 24, 2009, pp. 1-26.

Paarsch, H. "Deriving an Estimate of the Optimal Reserve Price: An Application to British Columbian Timber Sales" Journal of Econometrics, 78(2), pp. 333-357 (1997).

Pontryagin, L. "On the theory of differential games" Russian Mathematrical Surveys 21(4), 193-246 (1966).

Riley, J. et al. "Optimal Auctions" The American Economic Review, vol. 71, No. 3 (Jun. 1981)(, 381-392; http://www.eecs.harvard.edu/~parkes/cs286r/spring05/0-150a.pdf.

Roughgarden, T., et al. "Is Effciency Expensive?"; http://www.stanford.edu/~mukunds/papers/ss.pdf; May 2007.

Sun, J. "The Role of Value of Information Based Metareasoning in Adaptive Sponsored Search Auctions"—Published Date: Apr. 2, 2007; http://www.eecs.harvard.edu/econcs/pubs/jsun-thesis.pdf.

Tang, Xun, "Bounds on Revenue Distributions in Counterfactual Auctions with Reserve Prices"; http://economics.sas.upenn.edu/system/files/08-042.pdf; Dec. 24, 2009.

Varian, H. "Position Auctions" International Journal of Industrial Organization 25 (2007) 1163-1178; http://people.ischool.berkeley.edu/~hal/Papers/2006/position.pdf.

Vickrey, Wi. "Counterspeculation, Auctions, and Competitive Sealed Tenders"; http://www.wenli.net/teaching/752/Vickrey.pdf; Dec. 24, 2009.

Weber, T. et al. "A Model of Search Intermediaries and Paid Referrals" Information Systems Research, vol. 18, No. 4, pp. 414-436—Published Dated: Dec. 2007; http://www.stanford.edu/~webert/papers/Weber-Zheng-ISR-2007.pdf.

Liu, D. et al. "Ex Ante Information and the Design of Keyword Auctions" Information Systems Research; Articles in Advance, pp. 1-21—Published Dated 2009; http://cism.mccombs.utexas.edu/attachments/138_Ex%20Ante%20Information%20published.pdf.

(56) References Cited

OTHER PUBLICATIONS

Aggarwal, G. et al. "Truthful Auctions for Pricing Search Keywords"; http://citeseerx.ist.psu.edu/viewdoc.download?doi=10.1.1.74.7864&rep=rep1&type=pdf; Mar. 12, 2006.

Athey, S. et al. "Position Auctions with Consumer Search"; http://kuznets.havard.edu/~athey/position.pdf; May 2008.

Groves, T., "Incentives in Teams" Econometrica, vol. 41, No. 4, (Jul. 1973), pp. 617-631; http://bbs.cenet.org.cn/UploadImages/200642013305286207.pdf.

Haile, P., et al. "Inference with an Incomplete Model of English Auctions"; http://www.econ.yale.edu/~pah29/timer/haile-tamer.pdf (2003).

Krishna, V. "Auction Theory"; http://download-it.org/free_files/Cover,%20Contents%20and%20Copyright-3668118573c36b3bb05e267d72d7f98b.pdf; (2010).

McAfee, R. et al. "Extracting the Surplus in a Common Value Auction" Econometrica, vol. 57, No. 6 (Nov. 1989) 1451-1459; https://faculty-gsb.stanford.edu/mcmillan/personal_page/documents/Extracting%20the%20Surplus%20in%20the%20Common-Value%20Auction.pdf.

Riley, J. et al. "Optimal Auctions" The American Economic Review, vol. 71, No, 3 (Jun. 1981)(, 381-392; http://www.eecs.harvard.edu/~parkes/cs286r/spring05/0-150a.pdf.

Varian, H. "Position Auctions" International Journal of Industrial Organization 25 (2007) 1163-1178; http://people.ischool.berkely.edu/~hal/papers/2006/position.pdf.

Boltyanskiy, V.G.; et al. "Theory of optimal processes. I. The maximum principle"; http://www.dtic.mil/cgi-bin/GetTRDoc?AD=ADA365900&Location=U2&doc=GetTRDoc.pdf; May 1961.

Chernozhukov, V. et al. "Parameter set inference in a class of econometric models"; http://elsa.berkely.edu/users/mjanssan/Courses/ECON242_SPRING03/Tamer.pdf; Apr. 2003.

Position Auctions; http://people.ischool.berkeley.edu/~hal/Papers/2006/position.pdf; Nov. 2006.

* cited by examiner

TOOL FOR ANALYSIS OF ADVERTISING AUCTIONS

BACKGROUND

Online advertising is an important way for businesses to contact potential new customers. Advertising platforms can target advertisements to people who have requested information about a topic relevant to a product or service being advertised, which greatly increases the chances that the person who views an advertisement will be interested in the content and may ultimately become a customer of the advertiser.

To implement a system in which advertisers can have their advertisements displayed to people who are likely interested in the contents of the advertisement, advertising platforms may implement an auction system for advertising spaces. Each advertising space corresponds to a specific location for an advertisement on a web page that is rendered to a user in response to a specific request. In a sponsored search advertisement, that input is a search query that matches a certain phrase or certain keywords. Advertisers bid for ad spaces such that, when a web page is to be rendered, the advertising platform can select a winning bidder and insert an advertisement from the winning bidder into the web page before it is delivered to a computer user who has requested that web page.

Different advertising platforms implement auction rules differently, and the specific rules used for conducting an auction may be regarded as a trade secret of the advertising platform. However, the inventors believe that a very large percentage of ad spaces are auction using a variant of an auction format termed a Second Price Auction. Under these auction rules, the bidder offering the most value to the advertising platform is selected as the winner of the auction and has their advertisement displayed in the ad space. However, the winning bidder pays for the ad space an amount determined based on what others bid for the ad space.

In online advertising, frequently the advertiser does not pay for having their advertisement displayed unless a user "clicks" on the advertisement, indicating an interest in receiving more information from the advertiser. A "pay per click" system may impact the manner in which an advertising platform computes the value of each bid. An interesting advertisement for a desirable product is more likely to generate a "click" from a user and the advertising platform is more likely to be paid for that advertisement than for an advertisement that is uninteresting or for a less desired product. Accordingly, an advertising platform may attach a greater value to a bid for an interesting advertisement than to a less interesting advertisement, even if the advertiser presenting the less interesting advertisement has bid more for the ad space.

The advertising platform may represent this difference in value by a "quality factor" assigned to each advertisement. The quality factor may be derived, for example, from observations by the advertising platform of how frequently users click on an advertisement when it is displayed or on other factors, and may serve as a weighting factor for a bid made by an advertiser for a future ad space. In a "score-weighted auction," the quality factor may be used in selecting the winning bidder and determining the price paid. The bidder with the highest bid times quality factor wins the auction. That bidder pays a price that depends on the bid of the second highest bidder weighted by a quality factor assigned to that bidder.

A variation of a score-weighted auction is a "generalized second price auction." In a generalized second price auction, bidders are placed in order of their score-weighted bids, and the winning bidder pays the minimum price that causes that bidder to retain their position in the order.

In theory, each advertiser interested in an ad space selects a bid each time a user issues a request that will lead to rendering a web page that includes the ad space. However, in practice, the rate at which such web pages are rendered is too great to provide an advertiser a meaningful opportunity to compute a new bid. In practice, advertisers set bids and leave them in place for some period of time.

Determining what bid to make can become complex for an advertiser, because the winning bid and the cost of that winning bid depends both on what other bidders do and the quality factors assigned both to the bidding advertiser and to other bidders. To aid advertisers determine what to bid, some advertising platforms make tools accessible to advertisers. The tools may provide guidance to an advertiser as to the number of auctions an advertiser may win based on bids the advertiser may make and what the advertiser may expect to pay for the advertising space.

SUMMARY

The inventors have recognized and appreciated that the accuracy of existing tools for simulating auctions for ad spaces under various parameters can be improved. These improvements may benefit both advertisers and the advertising platform. Such improvements may be based on a computational approach for predicting an equilibrium condition for a generalized second price auction. The computation may be made without using assumptions that the inventors believe have led to inaccuracies in other prediction models. For example, some tools have modeled auctions based on an assumption that each advertiser has more knowledge than an advertiser likely possesses in the real world. As a specific example, prior tools have assumed that advertisers have knowledge about what other advertisers have bid or that advertisers have knowledge about the quality factors assigned to the advertisers. In addition, prior tools have assumed that advertisers adjust their bids for each auction, which may occur as frequently as once each time a web page is rendered in response to a search query or other event.

The inventors believe that each of these assumptions is inaccurate such that being able to predict a value per click for an advertiser and/or an equilibrium condition of an ad space auction without either or both of these assumptions will improve the accuracy of the prediction. In some aspects, an improved computer-implemented tool may use computational techniques that solve for an equilibrium condition of a generalized second price auction without inaccurate assumptions, such as on knowledge of the advertisers and/or frequency with which advertisers update their bids.

Such a tool may output information about predicted results of an auction, assuming specified parameters of the auction. As a result, either an advertiser or an operator of an advertising platform may use the tool to simulate results from an auction based on changes the advertising platform may make, such as to the advertiser's bid or the pricing rule for the auction. The tool may also output information about competition for different ad positions or other parameters of an auction that may be useful for either an advertiser or advertising platform.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Improved modeling of auctions for ad spaces may be applied to generate improvements in multiple ways. Improved modeling may provide an improved tool for aiding advertisers determine what to bid. Alternatively or additionally, the tool may be part of a simulator. The simulator may operate offline, allowing advertising platforms to experiment with changes in auction rules without having to disrupt actual auctions in progress and without having to suffer from the limitations inherent in testing new auction parameters on only a small fraction of web traffic.

Improved modeling may result from a solution for a generalized second price auction. Such a solution enables a tool to predict an equilibrium, reflecting likely bids and cost per click for each of a plurality of advertisers, based on auction parameters that may be input to the tool. The equilibrium for the auction may reveal results of the auction, such as the bids that each advertiser is likely to make in the equilibrium state, the relative rank of each advertiser, the number of auctions each advertiser is likely to win and the cost per click to each advertiser.

With such a tool, an advertiser or an advertising platform, may input new auction parameters and receive from the tool a prediction of expected auction results. Advertisers may use such a tool to experiment, off line, with different bids. In this way, the advertiser can identify an appropriate bid that may lead to a desired number of presentations for its advertisement. Alternatively or additionally, the advertiser can experiment with its bid to experiment with ways to alter its total cost in bidding on the ad space.

An operator of an advertising platform also may experiment off line. The operator may experiment with different pricing models or other parameters of an auction for an ad space, such as a reserve for the auction such that if no advertiser bids above the reserve, the advertising platform does not fill the ad space or fills it with a public service advertisement or other non-paid material.

Figure 1:
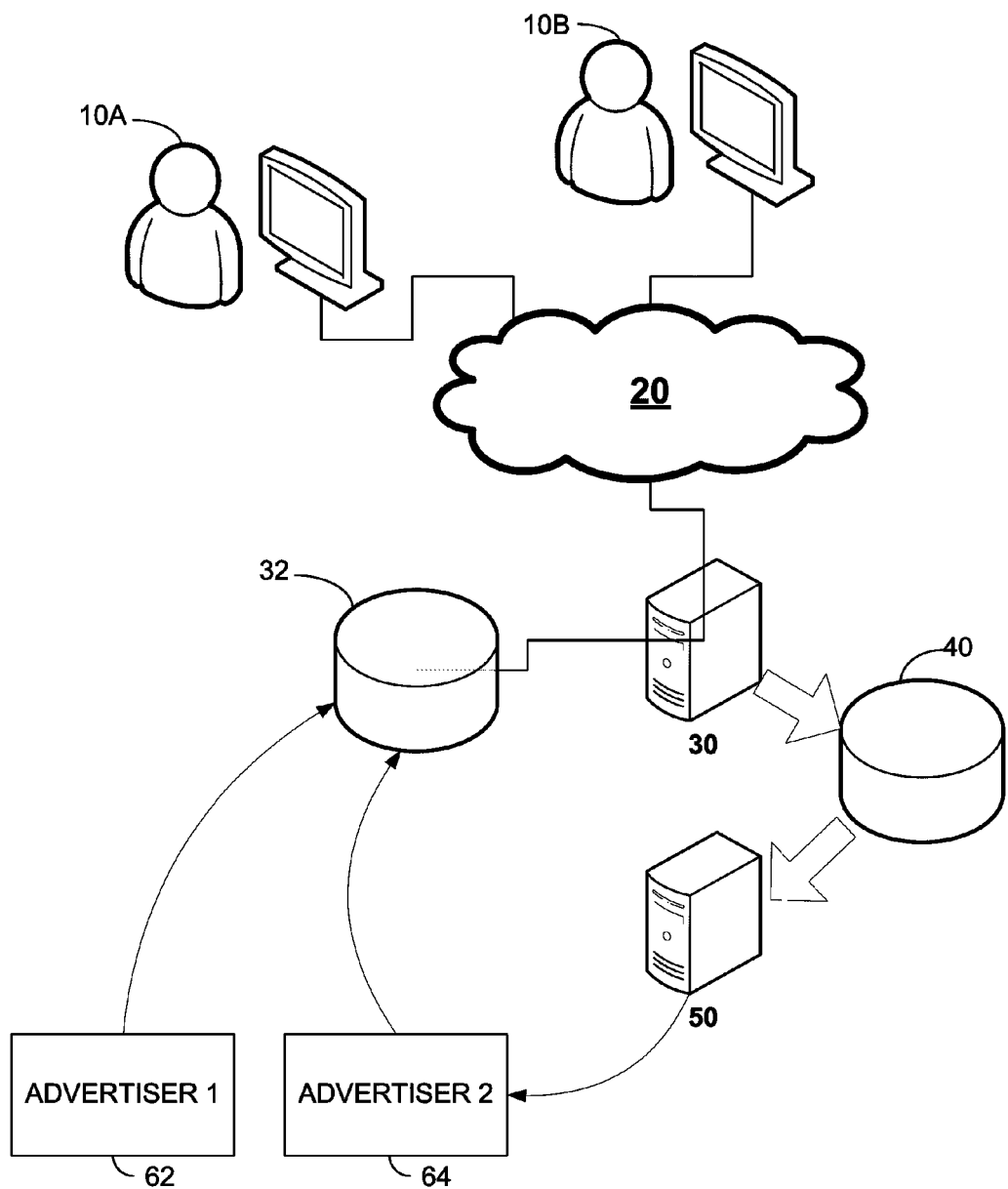
FIG. 1 is a sketch of an environment in which embodiments of the invention may operate.

FIG. 1 illustrates a system in which such a tool may operate. In the embodiment illustrated, the advertising platform provides sponsored search advertisements. In that scenario, the advertising platform may be integrated with a search engine. Though, it should be appreciated that tool may be used in connection with any other type of auction platform for ad spaces that uses a generalized second price algorithm to award instances of an ad space to advertisers or in connection with a generalized second price auction conducted in any suitable scenario.

Accordingly, FIG. 1 shows a search engine 30 that may contain an advertising platform. Though, it should also be appreciated that the functions of the search engine and advertising platform may be physically implemented in separate hardware components. For example, a search engine may notify the advertising platform that it is rendering a web page with an ad space and request from the advertising platform an advertisement for inclusion in that ad space. In this embodiment, the advertising platform may conduct an auction for the ad space and search engine need not conduct such an auction. Though, for simplicity only, the functions are implemented in a single device in FIG. 1.

Search engine 30 may be coupled over a network, such as Internet 20, to multiple users, such as users 10A and 10B. It should be appreciated that two such users are shown for simplicity. A system may provide access to many more than two users, and the number of users is not a limitation on the invention.

Each of the users, such as users 10A and 10B, may interact with search engine 30 through a web browser on a user computer or using other conventional techniques. Though, interactions may be performed in any suitable way. User interactions may entail submitting a request to a server that will generate a web page to be displayed to the user. In this example, that request may be in the form of a search query submitted to search engine 30.

Accordingly, search engine 30 may generate search results. Search engine 30 may format those results as part of a web page that is sent to the requesting user. That web page may contain space for one or more advertisements, which search engine 30 may select prior to sending the web page to the requesting user. Search engine 30 may select the advertisement based on a second price auction using auction parameters established by the advertising platform and bids submitted by advertisers.

In the example of FIG. 1, advertisers 62 and 64 are illustrated. Two advertisers are illustrated for simplicity. However, a commercial advertising platform may have many more than two advertisers bidding for ad spaces. Advertisers 62 and 64 may supply information to the advertising platform for use in conducting an auction. Here, that information is stored in data store 32. Though, it should be appreciated that an advertising platform may access information in any suitable location and data store 32 represents one or more storage locations that may be a source of information supplied by advertisers.

The information supplied by advertisers, such as advertisers 62 and 64 may include information identifying the ad spaces in which they are interested. In the example of sponsored search advertising, that information may include keywords which, if entered by a user as part of a search query, will result in display of an ad space. Though, other types of information may be provided, including a degree of similarity between the identified keywords and a search query for the web page returned in response to the search query to be regarded as containing the ad space. As another example, the advertiser may specify a demographic profile for a user to receive an advertisement such that the advertiser will only participate in an action for an ad space on a web page to be rendered to a user fitting the demographic profile.

Alternatively or additionally, the information may specify a location on the web page in which an advertisement may be displayed. It is known, for example, that advertisements displayed closer to the top of a web page or integrated with search results are more likely to be viewed by a user than advertisements placed elsewhere on a page. Therefore, different placement locations may be regarded as different ad placements, and an advertiser may wish to specify a specific ad placement.

Further, advertisers will specify a bid for each ad space of interest to the advertiser. Advertisers also supply content to display when their bid is the winning bid for any impression of an ad space. The content indicates the actual advertisement that will appear on the user's computer when the advertiser wins an auction for the ad space.

As shown, each of advertisers 62 and 64 has access to data store 32. This access allows each advertiser to input or change the parameters of the advertisers bid. Accordingly, it is possible for advertisers to change their bids at any time and as frequently, possibly even for every auction of an ad space. Though, in practice, each advertiser generally sets their bid parameters and leaves them in place for multiple auction cycles. Rather than changing for every auction cycle, an advertiser may change their bid occasionally, such as over a time frame of hours, days or weeks, during which time multiple auction cycles may occur. Accordingly, a simulation tool, as described in greater detail below, performs a simulation assuming that bids remain static over such time frames.

In operation, when a web page is generated in response to a user query, search engine 30 may access the data in data store 32 to identify advertisers who have outstanding bids for the ad space. Search engine 30 may use this information to conduct an auction for the ad space. In the embodiment illustrated, the auction may be a second price auction. Though, auction parameters may be set by the advertising platform.

Search engine 30 may select an advertiser as the winning bidder for the auction and then render a web page to the user, including content supplied by the advertiser that is the winning bidder. If the user clicks on the advertisement, indicating a request to receive further information about products or services in the advertisement, search engine 30 will receive an indication of the click. For example, in some embodiments, search engine 30 will receive a message indicating that the user clicked on the advertisement and route that request to the advertiser who supplied the advertisement. Though, any suitable mechanism may be used to alert search engine 30 to a user click.

Once the advertiser is alerted of the click, the advertiser may interact with the user, hopefully selling the user an advertised product or service. Search engine 30, which is implementing the advertising platform in this example, may record in data store 40 that a user clicked on an advertisement of a particular advertiser that appeared in a specific ad placement. As with data store 32, data store 40 may be implemented in any suitable way, such as in a single database or in a distributed database.

Information recorded in data store 40 may be used both for determining payment required by each advertiser for ad placements and for maintaining historical information on auction outcomes. For example, an advertising platform may charge each advertiser on a "per click" basis, such that an advertiser only pays for an ad placement when a user clicks on the advertisement, indicating a desire to receive more information. Information in data store 40 may allow the appropriate charges to be computed.

Historical information may be used for setting parameters of further auctions. Because the advertising platform charges only if a user clicks on an advertisement, the advertising platform may set a quality factor for advertisers associated with ad spaces based on the information in data store 40. That data may indicate the percentage of time that a user clicks on an advertisement, sometimes called the "click through rate" for that advertisement. Because an advertising platform will derive higher revenues, all things being equal, from an advertisement with a higher click through rate, a quality factor computed based on the click through rate may then be used as a weight on bids from each advertiser. By applying such a quality factor, the advertising platform may select a bid that will be of most value to the advertising platform. In addition, data store 40 may hold information about what non-winning bids and other information that may be used for analysis of auctions and projection of future auction results.

The foregoing describes operation of a single ad space. In a commercial system, an advertising platform may concurrently track numerous ad spaces. Accordingly, though not expressly described herein, the systems may concurrently process multiple ad spaces. Such processing may use known techniques for selection and display of advertisements in specific ad spaces.

In accordance with some embodiments of the invention, a tool may be provided to simulate results of an auction for an ad space. That tool may access the historical information in data store 40 and project results of auctions based on parameters of the auction that may be supplied to the tool. In this way, the tool may predict the results that can be expected by varying one or more parameters of the auction for an ad space.

In the example illustrated, the tool may operate in an off line mode such that it may operate while search engine 30 is actively conducting auctions for the ad space. In some embodiments, the tool may even operate in a separate server that has access to historical data in data store 40. In the example of FIG. 1, the tool may reside on server 50.

By interacting with server 50, advertisers 62 and 64 may access the tool. Advertisers may use the tool to predict one or more results of an auction, assuming that they provide one or more new parameters of the auction to the tool. An operator of an advertising platform may likewise access the tool by interacting with server 50. Such an operator may likewise supply new auction parameters and observe likely results.

Figure 2:
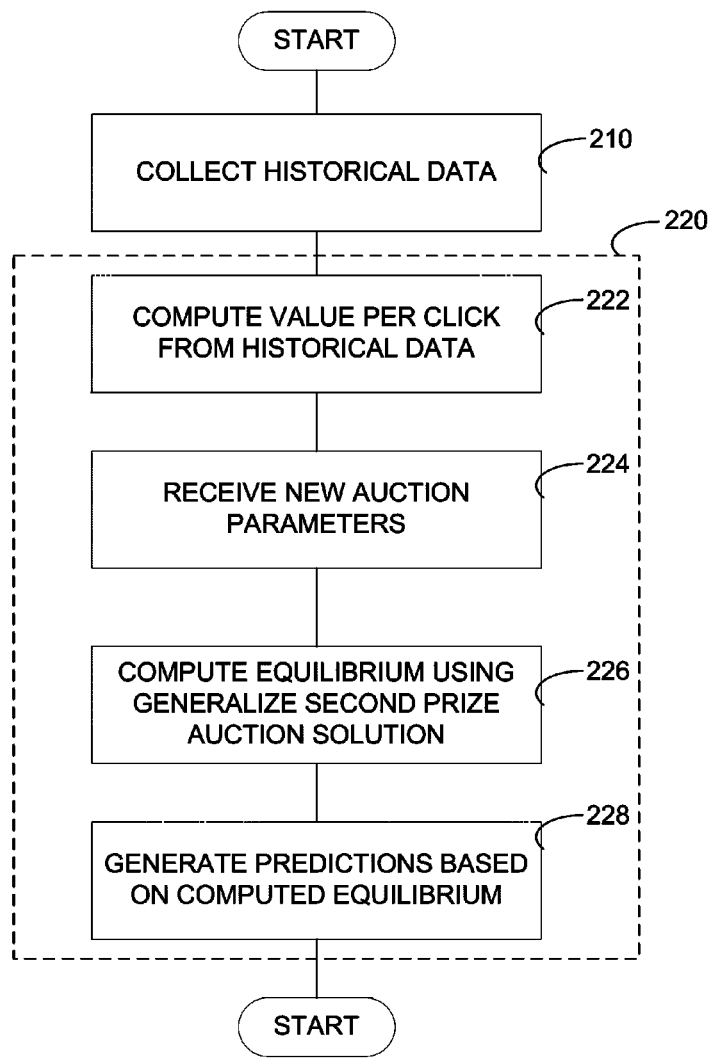
FIG. 2 is a flow chart of a method of operation of an auction simulation tool according to some embodiments.

FIG. 2 is a flow chart of a process by which a tool according to some embodiments may operate. The process of FIG. 2 may begin at block 210 where historical data is collected. This processing may be performed by search engine 30 during conduct of auctions for an ad space. Though, historical data may be collected in any suitable way by any suitable device or devices. Moreover, the process of collecting historical data may be an on-going process, with more data being added as more auctions for an ad space are conducted.

Regardless of when and how the historical data is collected, FIG. 2 shows that a sub-process 220 may be initiated. Sub-process 220 may be conducted by a tool executing on server 50, or any other suitable device or devices. Within sub-process 220, results of an auction, using parameters different than those used in collecting the historical data, may be computed.

Computation of predicted results may begin at block 222. At block 222, values are computed for the advertiser participating in the auction of the ad space. In the embodiment described herein, it is assumed that each advertiser may participate in multiple auction cycles. Accordingly, the advertisers participating in future auctions may be identified from historical data. Though, uncertainty as to which advertisers will participate in each auction can be modeled as described below.

The value computed for each advertiser may represent their value when a user clicks on their advertisement. Each advertiser may compute this value for themselves based on a conversion rate—the rate at which users who click through an advertisement ultimately buy a product or service from the advertiser. Though neither the advertising platform nor other advertisers will know the value of a click to an advertiser, that advertiser will know the value and will set a bid based on that value. Accordingly, the historical bids may reveal the value of actually winning the bid to each advertiser. An approach for determine this value from historical data is described in greater detail below.

Processing may then proceed to block 224. At block 224, the tool may receive input of new auction parameters. The input may be received in any suitable way. For example, server 50 may provide a graphical user interface through which a user may supply input identifying auction parameters or changes in auction parameters. The identified parameters may include any suitable parameters of an auction, including bids for advertisers or a pricing model, indicating what a winning bidder is charged for a click through of an advertisement selected in an auction. As other examples, the specified parameters may indicate a reserve set by the advertising platform or may include different quality scores for advertisers. Accordingly, it should be appreciated that the supplied parameters are not critical to the invention and any suitable parameters may be modeled.

Once the new parameters are received, the process may proceed to block 226. At block 226 an equilibrium condition for the auction may be computed based on the new parameters received at block 224 and the values computed at block 222. The equilibrium may describe the condition in which each advertiser is satisfied with its rank among all the other advertisers based on their respective bids. In this state, no advertiser has an incentive to either increase or decrease their bid unless some condition of the auction changes, representing an equilibrium.

In the illustrated embodiment, the equilibrium condition may be computed by applying a homotopy algorithm to determine a solution for a generalized second price auction. The computation may reflect the fact that each advertiser has uncertainty about the quality scores assigned to other advertisers and that quality scores may vary between auction cycles. A process of computing an equilibrium is described in greater detail below.

Regardless of how the equilibrium condition is determined, the equilibrium may be used to compute one or more results of the auction. For example, by determining the relative rank of advertisers based on their bids, by considering factors that change from bid to bid, the tool may compute the frequency with which an advertiser will be selected as the winning bidder. Also, by knowing the rank, the tool can identify what the winning bidder will be charged to maintain their position in that ordering. By applying click through rates, which can be obtained from historical data, for each winning bidder, the revenue obtained by the auction platform can be estimated by weighting the price charged to each winning bidder by their click through rate.

Other results that may be computed include an indication of a number of expected clicks on an advertisement in the ad space for an advertiser and an expected cost for the advertiser for placement of advertisements in the ad space. The information that can be predicted based on the equilibrium can also be used to compute revenue sharing between the advertisers and the advertising platform. Such a computation may be based on the computed values for the winning advertisers in comparison to the revenue to the advertising platform. Though, it should be appreciated that once the equilibrium condition is determined, any suitable results can be computed.

Computation of Value Per Click and Auction Equilibrium

This section describes an approach by which values per click may be derived from historical data. First, a model of an auction is defined.

The Model

A Static Model of a Score-Weighted Generalized Second-Price Auction

We begin with a static model, where I advertisers simultaneously place per-click bids $b_i$ on a single search phrase. The bids are then held fixed and applied to all of the users who enter that search phrase over a pre-specified time period (e.g. a few hours, a day or a week), and bidders pay their per-click bids when users actually click on their ads. There is a fixed number of advertising slots J in the search results page.

We model consumer searches as an exogenous process, where each consumer's clicking behavior is random and $\bar{c}_{i,j}$, the average probability that, a consumer clicks on a particular ad in a given position, is the same for all consumers. It will greatly simplify exposition and analysis to maintain the assumption that the parameters $\alpha_{i,j}$ (the of each advertiser i's CTR in position j relative to that in position 1) satisfy $\alpha_{i,j} = \alpha_{i',j} \equiv \alpha_j$ for all advertisements i, i'; we will maintain that assumption throughout the paper.[4] That is, there exists a vector of advertiser effects, $\gamma_i$, i=1, ... I, and position effects $\alpha_j$, j=1 ..., J, with $\alpha_b = 1$, such that $\bar{c}_{i,j}$ can be written $$\bar{c}_{i,j} = \alpha_j \gamma_i.$$

The ad platform conducts a click-weighted generalized second price auction. Each advertisement i is assigned score $s_i$, and bids are ranked in order of the product $b_i s_i$. In general discussion we will use j to index slots of the position auction and i to index bidders. However, if the bidders are arranged in order of their score-weighted bids $b_i s_i$, bidder i will be in slot j=i. The per-click price $p_i$ that the bidder in position i pays is determined as the minimum price such that the bidder remains in her position $$p_i = \min\{b_i : s_i b_i \geq s_{i+1} b_{i+1}\} = \frac{s_{i+1} b_{i+1}}{s_i}.$$

Note that advertiser i does not directly influence the pries that she pays, except when it causes her to change positions, so in effect an advertiser's choice of bid determines which position she attains, where the price per click for each position is exogenous to the bidder and rises with position.

To interpret this auction; observe that if for each i, $s_i = \gamma_i$, then the expected revenue the ad platform receives from placing bidder i in position i is $\alpha_i \gamma_i \gamma_{i+1} b_{i+1}$, which is what the platform would receive if instead, it had placed bidder i+1 in position i and charged bidder i+1 her per-click bid, $b_{i+1}$, for each click. So bidder i pays, in expectation. the per-impression revenue that would have been received from the next lowest bidder.

We assume that advertisers are interested in consumer clicks and each advertiser i has a value $v_i$ associated with the consumer click. The profile of advertiser valuations in a particular market $V = (v_1, \ldots, v_1)'$ is fixed, and advertisers know their valuations with certainty. Each click provides the advertiser i with the surplus $v_i - p_i$. The advertisers are assumed to be risk-neutral.

Initially, equilibrium behavior with no uncertainty is described. This model can then be extended to scenarios in which there each bidder does not know what quality scores are assigned to each advertiser and which advertiser will participate in each auction.

Equilibrium Behavior with No Uncertainty (NU)

The structure of Nash equilibria in the environment similar to that described in the previous sub-section has been considered in [7] and [16]. We can write the expected surplus of advertiser i front occupying the slot j as $$\bar{c}_{i,j}(v_i - p_j) = \alpha_j \gamma_i \left( v_i - \frac{s_{k_{j+1}} b_{k_{j+1}}}{s_i} \right).$$

where bidder $k_{j+1}$ is in slot, j+1.

The existing literature focus on the case where the bidders know the set of competitors as well as the score-weighted bids of the opponents, and they consider ex post equilibria, where each bidder's score-weighted bid must be a best response to the realizations of $s_{k_{j+1}} b_{k_{j+1}}$ (and recall we have also assumed that the $\bar{c}_{i,j}$ are known). Let us start with this case, which we will refer to as the "No Uncertainty" (NU) case.

The Set of bids constituting a full-information Nash equilibrium in the NU model, where each bidder finds it unprofitable to deviate from her assigned slot, are those that satisfy $$\alpha_j \left( v_{k_j} - \frac{s_{k_{j+1}} b_{k_{j+1}}}{s_{k_j}} \right) \geq \alpha_l \left( v_{k_j} - \frac{s_{k_{l+1}} b_{k_{l+1}}}{s_{k_j}} \right), l > j$$

$$\alpha_j \left( v_{k_j} - \frac{s_{k_{j+1}} b_{k_{j+1}}}{s_{k_j}} \right) \geq \alpha_l \left( v_{k_j} - \frac{s_{k_l} b_{k_l}}{s_{k_j}} \right), l < j.$$

It will sometimes be more convenient, to express these inequalities in terms of score-weighted values, as follows:

$$\min_{l<j} \frac{s_{k_l} b_{k_l} \alpha_j - s_{k_{j+1}} b_{k_{j+1}} \alpha_l}{\alpha_l - \alpha_j} \geq s_{k_j} v_{k_j} \geq \max_{l>j} \frac{s_{k_{j+1}} b_{k_{j+1}} \alpha_j - s_{k_{l+1}} b_{k_{l+1}} \alpha_l}{\alpha_j - \alpha_l}.$$

An equilibrium always exists, but it is typically not unique, and equilibria may not be monotone: bidders with higher score-weighted values may not be ranked higher.

The set of equilibria, which is called "envy-free": no bidder wants to exchange positions and bids with another bidder. The set of envy-free equilibria is characterized by a tighter set of inequalities:

$$s_{k_j} v_{k_j} \geq \frac{s_{k_{j+1}} b_{k_{j+1}} \alpha_j - s_{k_{j+2}} b_{k_{j+2}} \alpha_{j+1}}{\alpha_j - \alpha_{j+1}} \geq s_{k_{j+1}} v_{k_{j+1}}. \quad (3.1)$$

The term in between the two inequalities is interpreted as the incremental costs divided by the incremental clicks from changing position, or the "incremental cost per click" $ICC_{j,j+1}$:

$$ICC_{j,j+1} = \frac{s_{k_{j+1}} b_{k_{j+1}} \alpha_j - s_{k_{j+2}} b_{k_{j+2}} \alpha_{j+1}}{\alpha_j - \alpha_{j+1}}.$$

Envy-free equilibria are monotone, in that bidders are ranked by their score-weighted valuations, and have the property that local deviations are the most attractive—the equilibria can be characterized by incentive constraints that ensure that a bidder does not want to exchange positions and bids with either the next-highest or the next-lowest bidder.

The envy-free equilibria with the lowest revenue for the auctioneer and the one that coincides with Vickrey payoffs as well as the equilibrium of a related ascending auction game. This requires $$s_{k_j} v_{k_j} \geq ICC_{j,j+1} = s_{k_{j+1}} v_{k_{j+1}}. \quad (3.2)$$

Despite the fact that payoffs coincide with Vickrey payoffs, bidding strategies are not truthful: bidders shade their bids, trading off higher price per click in a higher position against the incremental clicks they obtain from the higher position.

Equilibrium Behavior with Score and Entry Uncertainty (SEU)

In reality, advertiser bids apply to many unique queries by users. Each time a query is entered by a user, the set of applicable bids is identified, scores are computed, and the auction is conducted as described above. In practice, both the set of applicable bids and the scores vary from query to query. This section describes this uncertainty in more detail and analyzes its impact on bidding behavior.

3.3.1 Uncertainty in Scores and Entry

The score that the auction engine assigns to the bidder varies from query to query. The ad platform produces scores at the advertisement-query level using a statistical algorithm. Note that the platform needs to produce these scores for combinations that have never been seen before, such as when a new advertisement or ad text is introduced, or when a search phrase is entered for the first time; but even for established ads on common queries, the scores are continually updated. To see why, note that a key component of the score is the bidder-specific component of the click-through rate. In practice, the distribution of consumers associated with a given search query and/or their preferences for given advertisers can change over time. User clicking behavior depends on many factors such as idiosyncratic shocks to consumer preferences and changes to the algorithmic search results.

We assume that the score of a particular bidder i is a random variable, denoted $s_i$, which is equal to $$s_i = \bar{s}_i \epsilon_i,$$

where $\epsilon_i$ is a shock to the score induced by random variation in the algorithm's estimates. We assume that the estimation noise has the same distribution across bidders. We will give more detailed assumptions further when we discuss the equilibrium properties of our model.

Now consider uncertainty in bidder entry. There are many sources of variation in the set of advertisements that are considered for the auction for a particular query. First, some bidders use budget constraints, which the ad platforms respect in part by spreading out the advertiser's participation in auctions over time, withholding participation in a fraction of auctions. Bidders may "pause" and "reactivate" their campaigns in order to respect their own budget constraints, as well. Second, many bidders experiment with multiple advertisements and with different ad text. These advertisements will have different click-through rates, and so will appear to other bidders as different competitors. Alternation between ads is required in order to learn about the performance of the different ad texts. Advertisers may introduce new advertisements, and it will take some time for the system to learn the click-through rates of these ads; and the ad platform's statistical algorithm may "experiment" with new ads in order to learn. Third, spine bidders may target their advertisements at certain demographic categories, and they may enter different bids for those categories. Fourth, in principle scores can vary according to user characteristics; for example, some advertisements may receive higher scores for bidders from some locations.

Figure 3:
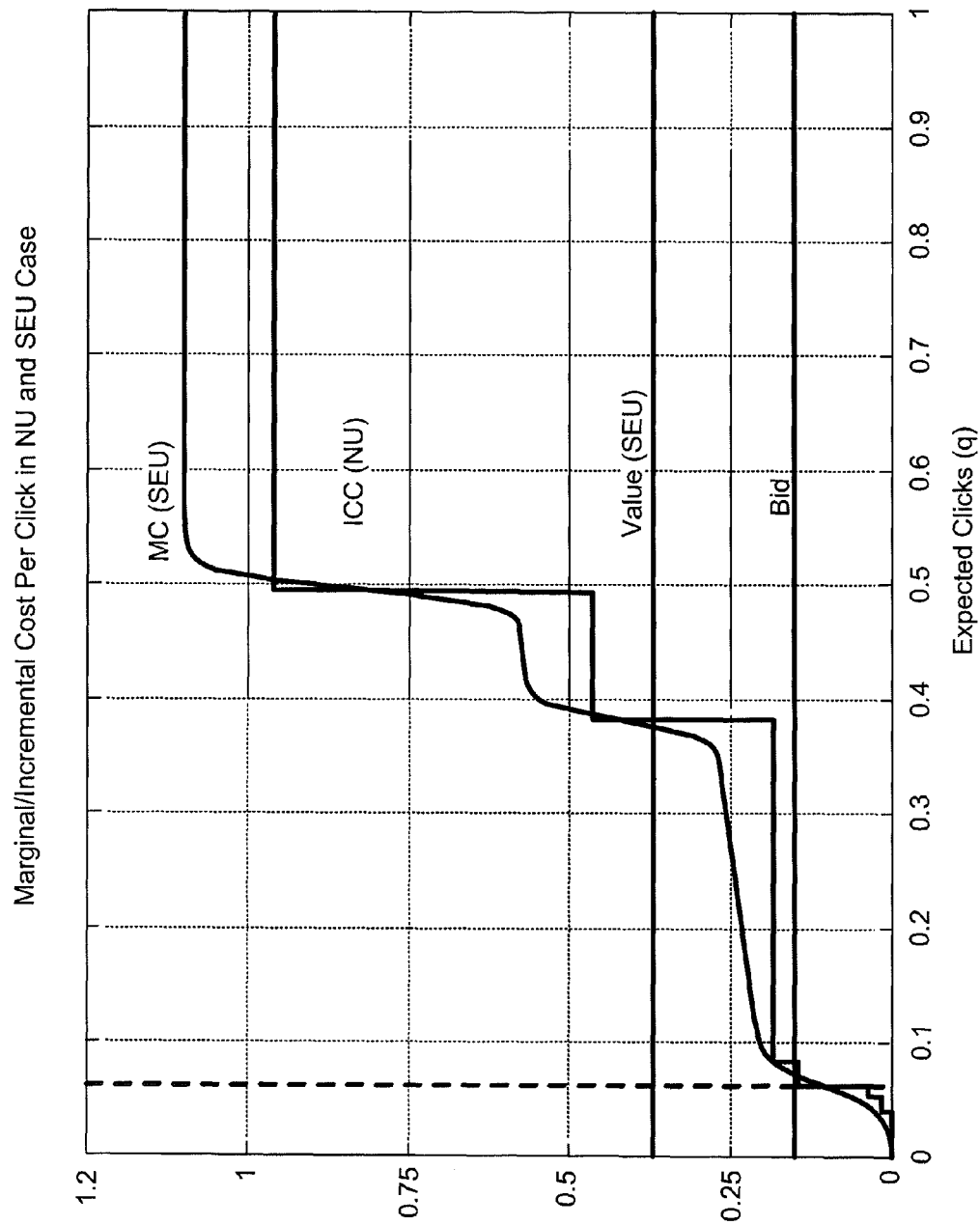
FIG. 3 is a graph illustrating differences in marginal cost per click when uncertainty is considered and when it is not.

For these and other reasons, it is typical for the configuration of ads to vary on the same search phrase; this variation is substantial for all three major search advertising platforms in the U.S. The role of the score and entry uncertainty can be illustrated by FIG. 3. The x-axis gives the expected click-through rate a bidder receives (the "click share"), relative to the click-through rate it would attain in the top position (that is, the average of $\alpha_j$ over the positions the bidder experiences). The step function in the figure shows the relationship between the incremental cost per click and expected number of clicks for a single user query, with a commonly observed configuration of advertisements and associated bids, and assuming that each bidder is assigned a score equal to the average score those advertisements received during the week. As the bidder in question's score-weighted bid increases and crosses the score-weighted bid of each opponent, the bidder moves to a higher position, receiving a higher average CTR. Given a value of $\alpha \epsilon [\alpha_{j+1}, \alpha_j]$, the associated incremental cost per click is $ICC_{j,j+1}$.

The smooth curve shows how uncertainty affects the incremental cost per click. Assuming that the same bid would be applied for all user queries in the sample, and incorporating uncertainty about quality scores, the curve shows the relationship between the expected click share and the "marginal cost" of additional clicks (we define this formally below and provide estimation details). The marginal cost curve increases smoothly rather than in discrete steps because the same advertisement with the same bid would appear in different positions for different users, and changing the bid slightly affects outcomes on a small but non-zero share of users.

This smoothness reflects the general variability of the environment faced by the advertisers. For the search phrases we consider, the most commonly observed advertisements have a standard deviation of their position number ranging from about one third of a position, to about 2 positions. The bidder in the figure placed a bid of 0.4 and received expected clicks of 7.2%.

Equilibrium Behavior in the Score and Entry Uncertainty (SEU) Model

Now we turn to analyze a full-fledged model of uncertainty. Consider a model of the auction that is the same as in the no-uncertainty (NU) model, with the following modifications. Bids are fixed for a large set of user queries on the same search phrase. We let $C^i$ be a random subset of advertisers excluding advertiser i, with typical realization $C^i$, and we assume that advertisers correctly anticipate the share of user queries where each configuration of opposing bidders $C^i$ will appear. In addition, each advertiser knows the mean of each opponent's score-weighted bid, $b_i \bar{s}_i$, as well as the distribution of shocks to scores, $F_\epsilon(\cdot)$. We consider ex post equilibrium in this environment: each bidder's bid is a best response to the opponent bids, taking into account the distribution of shocks to opponent scores and the distribution of opponents that will be faced. What is crucial is that the bidders understand the environment well enough to calculate the way the total clicks and total expenditures vary with their own bids, in expectation. Note that the major search engines provide this feedback to bidders through advertiser tools (that is, bidders can enter a hypothetical bid on a keyword and receive estimates of clicks and cost.).

Define $\Phi_{ik}^j$ to be an indicator for the event that, bidder i is in slot j and bidder k is in slot j+1, and let $C_j^i$ be a subset of $C^i$ with cardinality j. Let b, $\bar{s}$, $\epsilon$ be vectors of bids, mean scores, and shocks to scores, respectively Then:

$$\Phi_{ik}^j(b, \bar{s}, \epsilon; C^i) = \sum_{C_j^i} \prod_{m \in C_j^i \setminus \{k\}} 1\{b_m \bar{s}_m \epsilon_m > b_i \bar{s}_i \epsilon_i\}$$

$$\prod_{m \in C^i \setminus C_j^i} 1\{b_m \bar{s}_m \epsilon_m > b_k \bar{s}_k \epsilon_k\} 1\{b_i \bar{s}_i \epsilon_i > b_k \bar{s}_k \epsilon_k\}.$$

We can then write the expected number of clicks a bidder will receive as a function of her bid $b_i$ as follows:

$$Q_i(b_i; b_{-i}, \bar{s}) = E_{\tilde{C}^i, \epsilon} \left[ \sum_{j=1,\ldots} \sum_{k \in \tilde{C}^i} Pr(\Phi_{ik}^j(b, \bar{s}, \epsilon; \tilde{C}^i) = 1) \cdot \alpha_j \right].$$

The expected total expenditure of the advertiser for the clicks received with bid $b_i$ can be written $$TE_i(b_i; b_{-i}, \bar{s}) = E_{\tilde{C}^i, \epsilon} \left[ \sum_{j=1,\ldots} \sum_{k \in \tilde{C}^i} Pr(\Phi_{ik}^j(b, \bar{s}, \epsilon; \tilde{C}^i) = 1) \cdot \alpha_j \cdot \frac{\bar{s}_k \epsilon_k b_k}{\bar{s}_i \epsilon_i} \right].$$

Then, the bidder's problem is to solve $$\max_{b_i} EU_i(b_i; b_{-i}, \bar{s}) \equiv v_i \cdot Q_i(b_i; b_{-i}, \bar{s}) - TE_i(b_i; b_{-i}, \bar{s}). \quad (3.3)$$

We assume that the distributions of the scores have bounded supports. In general, the bidder's objective may be constant in its bid over certain ranges, because given that score distributions are bounded, there may be a range of bids that maintains the same average position. A pure strategy ex post equilibrium in this model may or may not exist; in the case where scores have a wide support, bidders will typically have a unique best response, and equilibrium existence is determined according to whether a solution exists to a system of nonlinear equations (the first-order conditions). In addition, the equilibrium may or may not be unique. Further we analyze these conditions.

Existence, Uniqueness, and Computation of Equilibrium in the SEU Model

In this section, we derive a particularly convenient representation of the conditions that characterize equilibrium in the SEU model, and then we show that standard results from the theory of ordinary differential equations can be used to provide necessary and sufficient conditions for existence and uniqueness of equilibrium. We start by making the following assumption regarding the distribution of the scores, which we maintain throughout the paper.

Assumption 1.

Assume that shocks to the scores are i.i.d. cross bidders with distribution. $F_\epsilon(\cdot)$, which does not have mass points and has an absolutely continuous density $f_\epsilon(\cdot)$ with a compact support on $[\underline{\epsilon}, \overline{\epsilon}]$. $f_\epsilon(\cdot)$ is twice continuously differentiable and strictly positive on $[\underline{\epsilon}, \overline{\epsilon}]$.

Many of the results in the paper carry over if these assumptions are relaxed, but they simplify the analysis substantially. In this section, the characterization of equilibrium relies on part 1.

Under Assumption 1, we can analyze the conditions under which the standard necessary and sufficient conditions for existence and uniqueness of a solution to this differential equation are satisfied in our model. Let EU (b, $\bar{s}$) be the vector of bidder expected utilities, and let D (b, $\bar{s}$) the matrix of partial derivatives $$D(b, \bar{s}) = \frac{\partial}{\partial b'} EU(b, \bar{s}).$$

Let $D_0(b, \bar{s})$ be the matrix obtained by replacing the diagonal elements of $D(b, \bar{s})$ with zeros. The system of first-order conditions that are necessary for equilibrium is given by $$v_i \frac{\partial}{\partial b_i} Q_i(b, \bar{s}_i) = \frac{\partial}{\partial b_i} TE_i(b, \bar{s}_i) \text{ for all } i. \quad (3.4)$$

The next result shows that these first-order conditions can be rewritten in an equivalent form that will turn out to be very convenient for establishing existence mid uniqueness of equilibrium. The lemma relies on the following identity:

$$\frac{d}{d\tau} EU_i(\tau b, \bar{s})|_{\tau=1} = -TE_i(b, \bar{s}), \quad (3.5)$$

that is, a proportional increase in all bids decreases bidder i's utility at the rate $TE_i(b, \bar{s})$, the amount bidder i is spending. The intuition is that ranks and prices depend on the ratios of bids, so a proportional change in all bids simply increases costs proportionally. The lemma works by combining (3.5) with the first-order conditions, to conclude that a proportional increase in opponent bids only decreases utility at the rate $TE_i(b, \bar{s})$: this follows because when bidder i is optimizing, a small change in her own bid has negligible impact.

LEMMA 1 Let EU $(b, \bar{s})$ be the vector function of the expected utilities for bidders, let TE $(b, \bar{s})$ be the vector of total expenditure functions, and assume that $D_0$ and TE are continuous in b. Suppose that $Q_i(v, \bar{s}_i) > 0$. Then a vector of bids b satisfies the first order necessary conditions for equilibrium (3.4) if and only if $$\frac{d}{d\tau} EU_i(b_i, \tau b_{-i}, \bar{s})|_{\tau=1} = -TE_i(b, \bar{s}) \text{ for all } i. \quad (3.6)$$

Proof: Denote the vector of mean scores of bidders $\bar{s}$. Denote the probability of bidders i and k from configuration $C^i \cup \{i\}$ being in positions j and j+1 by $G_{ik}^j(b, \bar{s}, C^i)$. Then $G_{ik}^j(b, \bar{s}, C^i) = \int \Phi_{ik}^j(b, \bar{s}, \epsilon:C^i) \, dF_\epsilon(\epsilon)$, recalling that $\Phi_{ik}^j$ is an indicator for the event that bidder i is in slot j and bidder k is in slot j+1. The total quantity of clicks for bidder i can be computed as $$Q_i(b_i, b_{-i}; \bar{s}_i) = \sum_{C^i} \sum_{k \in C^i} \sum_{j=1}^{J} \alpha_j G_{ik}^j(b, \bar{s}, C^i).$$

The total expenditure can be computed as $$TE_i(b_i, b_{-i}; \bar{s}_i) = b_i \sum_{C^i} \sum_{k \in C^i} \sum_{j=1}^{j} \alpha_j \int \frac{\bar{s}_k b_k \epsilon_k}{\bar{s}_i b_i \epsilon_i} \Phi_{ik}^j(b, \bar{s}, \epsilon; C^i) dF_\epsilon(\epsilon).$$

Note that $TE_i(b_i, b_{-i}:\bar{s}_i)/b_i$ is homogeneous of degree zero in b.

The function $C_{ik}^j(b, \bar{s}, C^i)$ is homogeneous of degree zero in bas well. As a result, $$\sum_{k'=1}^{K} b_{k'} \frac{\partial}{\partial b_{k'}} G_{ik}^j(b, \bar{s}, C^i) = 0.$$

Then, the following identity holds $$\frac{\partial}{\partial b'} EU(b, \bar{s}) b = -TE(b, \bar{s}), \quad (3.7)$$

which can in turn be rewritten as, for each i, $$\frac{d}{d\tau} EU_i(b_i, \tau b_{-i}, \bar{s})|_{\tau=1} + b_i \frac{\partial}{\partial b_i} EU_i(b_i, b_{-i}, \bar{s}) = -TE_i(b, \bar{s}).$$

Thus, (3.6) is equivalent to $$\frac{\partial}{\partial b_i} EU_i(b_i, b_{-i}, \bar{s}) = 0$$

whenever $b_i > 0$. Q.E.D.

Lemma 1 transforms the system of first-order conditions into an equivalent form. We can then define a mapping $\beta(\tau)$ which, under some regularity conditions imposed on the payoff function, will exist in some neighborhood of $\tau=1$:

$$\tau \frac{d}{d\tau} EU_i(\beta_i(\tau), \tau \beta_{-i}(\tau), \bar{s}) = -TE_i(\beta_i(\tau), \tau \beta_{-i}(\tau), \bar{s}), \quad (3.8)$$

for all bidders i. If the vector of expected utilities maintains regularity for all $\tau$ it will be possible to consider $\tau \in [0, 1]$. The next theorem establishes the conditions under which the mapping $\beta(\tau)$ exists locally around $\tau=1$ and globally for $\tau \in [0, 1]$.

Theorem 1.

Consider a position auction in the SEU environment with a reserve price $r > 0$. Let EU $(b, \bar{s})$ be the vector function of the expected utilities for bidders, and let TE $(b, \bar{s})$ be the vector of total expenditure functions, and assume that $D_0$ and TE are continuous in b. Suppose that $Q_i(v, \bar{s}_i) > 0$, and that each $EU_i$ is quasi-concave in $b_i$ and for each b its gradient contains at least one non-zero element. Then:

(i) An equilibrium exists if and only if for some $\delta > 0$ the system of equations (3.8) has a solution on $\tau \in [1-\delta_1, 1]$.

(ii) The conditions from part (i) air satisfied for all $\delta \in [0, 1]$, and so an equilibrium exists, if $D_0(b, \bar{s})$ is locally Lipschitz and non-singular in its support except a finite number of points.

(iii) There is a unique equilibrium if and only if for some $\delta > 0$ the system of equations (3.8) has a unique solution on $\gamma \in [1-\delta_1, 1]$.

(iv) The conditions from part (iii) are satisfied for all $\delta \in [0, 1]$, so that there is a unique equilibrium, if each element of $$\frac{\partial}{\partial b^i} EU(b, \bar{s})$$

is Lipschitz in b and non-singular on the entire support.

Theorem 1 makes use of a high-level assumption that the matrix of first derivatives of expected utilities of bidders is non-singular. In the following lemma we provide more primitive conditions outlining empirically relevant cases where this assumption is satisfied.

LEMMA 2 Suppose that the bidders are arranged according to their mean score weighted values $\bar{s}_i b_i \geq \bar{s}_{i+1} b_{i+1}$ for $i=1, \ldots, I-1$. The matrix of first derivatives of expected utilities of bidders, when the first-order conditions are satisfied, is non-singular if for each bidder her utility is strictly locally monotone in the bid of either bidder above or below her in the ranking or both.

We can proove this lemma, for instance, in case where $$\frac{\partial EU_i}{\partial b_{i-1}} \neq 0$$

for $i=2, \ldots, I$ and $$\frac{\partial EU_1}{\partial b_2} \neq 0.$$

The diagonal elements of the matrix $D_0(b, \bar{s})$ are zero. Therefore, we can compute the determinant $$\det(D_0(b, \bar{s})) = -\frac{\partial EU_1}{\partial b_2} \prod_{I>2} \frac{\partial EU_i}{\partial b_{i-1}} \neq 0.$$

i.e. the matrix $D_0(\cdot)$ is non singular.

Equation (3.8) plays the central role in determining the equilibrium bid profile. Note that it can be used as a practical device to compute the equilibrium bids. Suppose that functions $TE_i$ and $EU_i$ are known for all bidders. Then, initializing $\beta(0)=0$, we treat thy: system of equations (3.8) as a system of ordinary differential equations for $\beta(\tau)$. We can use standard methods for numerical integration of ODE if the closed-form solution is not available. Then the vector $\gamma(1)$ will correspond to the vector of equilibrium bids.

Now consider more details about the computation of equilibria. The idea behind these methods can be described as follows. Suppose that one needs to solve a system of non-linear equations $$H(b)=0,$$

where H: $\mathbb{R}^N \mapsto \mathbb{R}^N$ and $b \in \mathbb{R}^N$. This system may be hard to solve directly because of significant non-linearities. However, suppose that there exists a function F $(b, \tau)$ such that F: $\mathbb{R}^N \times [0, 1] \mapsto \mathbb{R}^N$ with the following properties. If $\tau=0$, then the system $$F(b,0)=0$$

has an easy-to-find solution, and if $\tau=1$ then $$F(b,1)=H(b)=0.$$

Denote the solution of the system $F(b, 0)=0$ by $b_0$. If F is smooth and has a non-singular Jacobi matrix, then the solution of the system $$F(b,\tau)=0$$

will be a smooth function of $\tau$. As a result, we can take the derivative of this equation with respect to $\tau$ to obtain $$\frac{\partial F}{\partial b'} \dot{b} + \frac{\partial F}{\partial \tau} = 0, \text{ where } \dot{b} = \left(\frac{db_1}{d\tau}, \ldots, \frac{db_N}{d\tau}\right)'.$$

This expression can be finally re-written in the form $$\dot{b} = -\left(\frac{\partial F}{\partial b'}\right)^{-1} \frac{\partial F}{\partial \tau}.$$

This is a system of differential equations to solve for functions $\beta(\tau)$. We know that $\beta(0)=b_0$ and $\beta(1)$ corresponds to the solution of the system of equations of interest. Therefore, if we solve this system of differential equations and find the value $\beta(1)$ then we effectively solve the system of the first-order coalitions. Numerical solution of a system of ordinary differential equations is usually easier than the solution of the system of non-linear equations.

The computational approach we propose is to use Theorem 1 to derive a function F with the desired properties, so that we can apply the approach to our problem. In particular, we define F using (3.8). If the payoff function is twice continuously differentiable and the equilibrium existence conditions are satisfied, then F has the desired properties.

Bidder Incentives in the SEU Model

Each advertiser may be regarded as a bidder.

It is easier to understand the bidder's incentives in terms of general economic principles if we introduce a change of variables. When bidding, the advertiser implicitly selects an expected quantity of clicks, and a total cost for those clicks. Fix $b_{-i}, \bar{s}$ and suppress them in the notation, and define $$Q_i^{-1}(q_i) = \inf\{b_i: Q_i(b_i) \geq q_i\},$$

and define $$TC_i(q_i) = TE_i(Q_i^{-1}(q_i)).$$

$$AC_i(q_i) = TE_i(Q_i^{-1}(q_i))/q_i.$$

Then, the bidder's objective can be rewritten as $$\max_{q_i} q_i(v_i - AC_i(q_i)).$$

This is isomorphic to the objective function faced by all oligopsonist in an imperfectly competitive market. As usual, the solution will be to set marginal cost equal to marginal value, when the average cost curve is differentiable in the relevant range (assume it is for the moment).

$$v_i = q_i AC_i'(q_i) + AC_i(q_i) \equiv MC_i(q_i) \qquad (3.9)$$

The bidder tracks off selecting a higher expected CTR $q_i$ and receiving the average per-click profit $v_i - AC_i(q_i)$ on more units, against the increase in the average cost per click that will be felt on all existing clicks. The optimality conditions can be rewritten in the standard way:

$$\frac{v_i - AC_i(q_i)}{AC_i(q_i)} = \frac{d\ln AC_i(q_i)}{d\ln(q_i)}.$$

The bidder's profit as a percentage of cost depends on the elasticity of the average cast per click curve.

To see how this works in practice, consider the following figure, which illustrates the average cost curve $AC_i(q_i)$, marginal cost curve $MC_i(q_i)$, and the required bid curve $Q_i^{-1}(q_i)$ for a given search phrases, selecting a particular bidder, call it i. For bidder i, we took the actual bid of the advertiser, $b_i$ and calculated $q_i = Q_i(b_i; b_{-i}, \bar{s})$. We then calculated $MC_i(q_i)$, and define $v_i = MC_i(q_i)$, as illustrated in the figure. This is the valuation that is consistent with equilibrium bidding for the advertiser in question. We then calculated the bidder's implied profits, illustrated in the figure with the shaded area.

Now suppose that the average cost curve is not differentiable. This occurs when score uncertainty has limited support, and when there is not too much uncertainty about entry Then, the total cost curve changes slope (has a "kink") when $q_i$ reaches a point where a higher click-through rate requires bidding sufficiently high that there is some probability of defeating an additional opponent, where previously that opponent was defeated with probability zero: the slope of the total cost curve will be the incremental cost per click from achieving the next change in click-through rate, which will in general be a discrete change. That is, the slope is the change in total cost divided by the incremental change in clicks fixing changing position. Then, the marginal cost curve will have gaps, which implies that there may be multiple values that are consistent with a bid that leads to that particular $q_i$.

Assuming that position dependent click through rates are known, such as a result of historical data, the valuations of the bidders can be identified, even when there is score and entry uncertainty.

The Score and Entry Uncertainty Model

For the case where $Q_i(b_i)$ and $TE_i(b_i)$ are strictly increasing and differentiable, we can recover the valuation of each hid using the necessary condition for optimality $$v_i = MC_i(Q_i(b_i)), \quad (4.11)$$

given that all of the distributions required to calculate $MC_i(q_i)$ are assumed to be observable. Note that the local optimality condition is necessary but not sufficient for $b_i$ to be a best response bid for a bidder with value $v_i$; a testable restriction of the model is that the bid is globally optimal. One requirement for global optimality is that the objective function is locally concave at the chosen bid: $MC_i^{-1}(Q_i(b_i)) \geq 0$. A sufficient (but not necessary) condition for global optimality is that $MC_i$ is increasing everywhere, since this implies that the bidder's objective function (given opponent bids) is globally concave, and we can conclude that indeed, $b_i$ is an optimal bid for a bidder with value $v_i$. If $MC_i$ is nonmonotone, then global optimality of the bid should be verified directly.

Now consider the case where $TE_i(b_i)$ is not differentiable everywhere. This analysis parallels the "kinked demand curve" theory front intermediate microeconomics. Note that $Q_i(b_i)$ is nondecreasing and continuous from the left, so it must be differentiable almost everywhere. If $Q_i(\cdot)$ is constant on $[b_i', b_i'')$ and then increasing at $b_i''$, then $Q_i^{-1}(q_i) = b_i'$ for $q_i \in [Q_i(b_i'), Q_i(b_i''))$, while $Q_i^{-1}(Q_i(b_i'')) = b_i''$. This implies in turn that $TC_i(\cdot)$ is non-differentiable at $Q_i(b_i'')$, and that $MC_i(\cdot)$ jumps up at that point. Thus, if we observe any $b_i$ on $[b_i', b_i'')$, the assumption that this bid is a best response implies only that $$v_i \in [MC_i(Q_i(b_i')), MC_i(Q_i(b_i''))]. \quad (4.12)$$

Summarizing:

Theorem 2.

Consider the SEU model, where bids are fixed over a large number of queries. Suppose that we observe the bids of I bidders $(b_1, \ldots, b_I)$, the joint distribution of their scores s and entrants in each query. Then:

(i) Bounds on the valuation for bidder i are given by (4.12), where $b_i' = Q_i^{-1}(Q_i(b_i); b_{-i}, \bar{s})$, and $b_i'' = \sup\{b_i''' : Q_i(b_i'''; b_{-i}, \bar{s}) = Q_i(b_i; b_{-i}, \bar{s})\}$.

(ii) A necessary and sufficient condition for the observed bids to be consistent with ex post equilibrium is that for some $(v_1, \ldots, v_I)$ within the bounds from (i), the observed bids $(b_1, \ldots, b_I)$ are globally optimal for a bidder solving (3.3). A sufficient condition is that $MC_i(\cdot)$ is nondecreasing for each i.

The proof follows directly from the discussion above and the fact that the functions $Q_i$ and $MC$, are uniquely defined from the observed bids and the distribution of scores and entrants.

The equilibrium is not necessarily envy-free, and it is not necessarily monotone, in that bidders with higher score-weighted valuations place higher score-weighted bids. However, if there are many bidders and substantial uncertainty, each bidder's objective function will be similar once bids and valuations are adjusted for scores, and monotonicity will follow.

Value Per Click

In this section we demonstrate how the expected payoff of a bidder in a position auction can be recovered from the data. The structure of the data for position auctions makes the estimation procedure different from the standard empirical analyses of auctions. In the setup of online position auctions the same set of bids will be used in a set of auctions. In our historical data sample most bidders keep their bids unchanged during the considered time period. In our data sample a portion of advertisers have multiple simultaneous ads. Bidders submit a separate bid for each ad. Our analysis will be facilitated by the fact that the ads of the same advertiser do not compete and never show up on the same page. We will use a simplifying assumption that bidders maximize an expected profit from bidding for each ad separately. We will assume that bidders have a separate valuation for each ad and the goal of our numerical procedure will be to recover valuations of the bidders corresponding to each ad.

Previously we assumed that de-meaned scores have the same distribution across advertisers. We use an additional subscript t to indicate recorded impressions with bidder configurations. We assume that the number of advertisers I is fixed and denote $$N_i = \Sigma_t 1\{i \in C_t\}$$

the number of impressions where advertiser i was observed. Our further inference is based on the assumption that $N_i \to \infty$ for all bidders $i = 1, \ldots, I$.

We impose the following assumption regarding the joint distribution of shocks to the scores and configurations.

ASSUMPTION The random vector $(C_t; \{\epsilon_{i,t}\})$ is i.i.d. across the realizations of impressions t and the mean scores $\{\bar{s}_i\}_{i=1}^I$ are fixed across bidders.

Note that this assumption does not eliminate potential selection of the bidders into configurations due to values of their bids. A configuration of the bidders is determined, on the one hand, by the bidding behavior: the bidders with J highest score-weighted bids will be in this configuration provided that their score-weighted bids take J biggest values among the bidders, and they exceed the reserve prices. On the other hand, participation of bidders may be determined by other factors such as budget constraints of their advertising campaigns. Our assumption implies that these factors do not lead to selection of bidders. Provided conditions allow us to consistently estimate the components of the payoff function of the bidder and its slope. This result may be used for estimation of payoffs of bidders. Though, in this section it is described as used to estimate bidders' valuations.

To analyze the uncertainty of the scores we use their empirical distribution. In our model for bidder i the score is determined as $s_i = \bar{s}_i \epsilon_i$. We estimate the mean score from the observed realizations of scores for bidder i for impressions t as $$\hat{\bar{s}}_i = \exp\left(\frac{1}{N_i} \sum_t 1\{i \in C_t\} \log s_{i,t}\right).$$

Then we form the sample of estimated shocks to the scores using $$\hat{\varepsilon}_{it} = \frac{s_{it}}{\bar{s}_t}.$$

Under our assumptions as $N_i \to \infty$ the empirical distribution $$\hat{F}_\varepsilon(\varepsilon) = \frac{1}{I} \sum_{i=1}^{I} \frac{1}{N_i} \sum_t 1\{i \in C_t\} 1\{\hat{\varepsilon}_{it} \leq \varepsilon\}$$

is a consistent estimator for the distribution of the shocks to the scores $F_\varepsilon(\cdot)$.

In the case where the expected payoff function has a unique maximum for each value of the bidder we can use a much simpler approach to evaluation of the bidder's first-order condition. We associated this case with the case of a substantial overlap of the click-weighted bids. We found that in this case we can characterize the first-order condition of the bidder as $$v_i \frac{\partial Q_i(b_i, b_{-i}, \bar{s})}{\partial b_i} - \frac{\partial TE_i(b_i, b_{-i}, \bar{s})}{\partial b_i} = 0.$$

As a result, the value can be computed as a function of the own and rival bid as the marginal expected cost per click.

Each of the functions needed to recover the value can be estimated from the data. We use empirical distribution of the scores to approximate the uncertainty in the scores and use the observed bidder configurations to approximate the uncertainty in bidder configurations. To compute the approximation we make independent sampling from the empirical sample of configurations and estimated shocks to the scores $\{C_t^i, \hat{\epsilon}_{k1}\}_{t,k=1...I}$ excluding the bidder of interest i from the sample (recall that we denoted by $C^i$ the configuration excluding bidder i). Following the literature on bootstrap we index the draws from this empirical sample by t* and denote the sinadated sample size T*. A single draw t* will include the configuration $C_{t^*}^i$ and the shocks to the scores for all bidders $\hat{\epsilon}_{1t^*}, \ldots, \hat{\epsilon}_{It^*}$. For consistent inference we require that $$\frac{N_i}{T^*} \to 0$$

for all i=1..., I. Then for each such draw we compute the rank of the bidder of interest i as $$\text{rank}_i(C_{t^*}^i) = \text{rank}_i\{b_i \hat{\bar{s}}_i \hat{\epsilon}_{it}^* : b_k \hat{\bar{s}}_k \hat{\epsilon}_{kt}^*, \forall k \in C_{t^*}^i\}.$$

We also compute the price paid by bidder i as $$Price_i(C_{t^*}^i) = \frac{b_k \hat{\bar{s}}_k \hat{\epsilon}_{kt^*}}{\hat{\bar{s}}_i \hat{\epsilon}_{it^*}},$$

such that $\text{rank}_k(C_{t^*}^i) = \text{rank}_i(C_{t^*}^i) + 1$.

Then we estimate the total expenditure function as $$\hat{TE}_i(b_i, b_{-i}, \bar{s}) = \frac{1}{T^*} \sum_{t^*=1}^{T^*} \hat{\alpha}_{rank_i(C_{t^*}^i)} Price_i(C_{t^*}^i),$$

and the expected quantity of clicks as $$\hat{Q}_i(b_i, b_{-i}, \bar{s}) = \frac{1}{T^*} \sum_{t^*=1}^{T^*} \hat{\alpha}_{rank_i(C_{t^*}^i)}.$$

At the next step we estimate the derivatives. To do that we use a higher-order numerical derivative formula. For a step-size $\tau_N$, depending on the sample size, we compute the implied value as $$\hat{r}_t = \frac{-\hat{TE}_t(b_t - 2\tau_N, b_{-t}, \bar{s}) + 8\hat{TE}_i(b_i - \tau_N, b_{-i}, \bar{s}) - 8\hat{TE}_i(b_i + \tau_N, b_{-i}, \bar{s}) + \hat{TE}_i(b_i + 2\tau_N, b_i, \bar{s})}{-\hat{Q}_i(b_i - 2\tau_N, b_{-i}, \bar{s}) + 8\hat{Q}_i(b_i - \tau_N, b_{-i}, \bar{s}) - 8\hat{Q}_i(b_i + \tau_N, b_{-i}, \bar{s}) + \hat{Q}_i(b_i + 2\tau_N, b_{-i}, \bar{s})}.$$

The choice of $\tau_N$ such that $\sqrt{N_i \tau_N} \infty$, $\sqrt{N_i} \tau_N^3 \to 0$ and $\tau_N \to 0$ for all i=1, ..., I assures that the empirical numerical derivative above converges to the slope of the population marginal cost, function. We use this formula to recover the implied valuations.

Theorem 4.

Under the assumptions of Theorem 5, the derivative of the total expenditure function with respect to the bid vector satisfies the Lindebery condition and has a finite variance in the limit, while the derivative of the total quantity of clicks with respect to the bid vector is non-vanishing in the limit our estimator of valuations is asymptotically normal:

$$\sqrt{N_i \tau_N} (\hat{v}_i - v_i) \xrightarrow{d} N\left(0, \frac{324\Omega}{(Q_i'(b_i, b_{-i}, \bar{s}))^2}\right)$$

where $$\Omega = \text{Var}\left(\frac{U_{it}(b_i + \tau_N, b_{-i}, \bar{s}) - U_{it}(b_i - \tau_N, b_{-i}, \bar{s})}{\sqrt{\tau_N}}\right)$$

This shows that with the increasing number of impressions, the estimates of advertiser's valuations will be asymptotically normal and their asymptotic variance will be determined by the variance of the profit per click for the advertiser of interest.

Our analysis extends to the case where the objective function of the bidder can have a set of optimal points.

Computing Equilibria Via Numerical Continuation

For $\tau \in [0,1]$ the system (3.8) can be re-written as $$\sum_{j \neq i} \frac{\partial EU_i(\beta_i(\tau), \tau\beta_{-i}(\tau), \bar{s})}{\partial b_j} \tau b_j(\tau) = -TE_i(\beta_i(\tau), \tau\beta_{-i}(\tau), \bar{s}), \quad (G.\ 24)$$

$$i = 1, \ldots, N.$$

If the payoff function is twice continuously differentiable and the equilibrium existence conditions are satisfied, then $\beta(\tau)$ is a smooth function of $\tau$. As a result, we can further differentiate both sides of this expression with respect to $\tau$. For the left-hand side we can obtain $$\sum_{j,k \neq i} \frac{\partial^2 EU_i(\beta_i(\tau), \tau\beta_{-i}(\tau), \bar{s})}{\partial b_j \partial b_k} [\tau^2 b_j b_k + \tau b_j b_k] + \quad (G.\ 25)$$

$$\frac{\partial^2 EU_i(\beta_i(\tau), \tau\beta_{-i}(\tau), \bar{s})}{\partial b_j \partial b_i} \tau b_j b_i +$$

$$\sum_{j \neq i} \frac{\partial EU_i(\beta_i(\tau), \tau\beta_{-i}(\tau), \bar{s})}{\partial b_j} [\tau b_j + b_j],$$

where $b = \frac{db}{d\tau}$.

Then using the notation $\delta_{kj}$ for the Kronecker symbol, we can re-write the expression of interest as $$\sum_k a_k^i b_k = c^i, \quad (G.\ 26)$$

and $$a_k^i = [\tau^2(1 - \delta_{ik}) + \tau\delta_{ik}] \sum_{j \neq i} \frac{\partial^2 EU_i(\beta_i(\tau), \tau\beta_{-i}(\tau), \bar{s})}{\partial b_j \partial b_k} b_j b_k +$$

$$\tau(1 - \delta_{ik}) v_i \frac{\partial Q_i(\beta_i(\tau), \tau\beta_{-i}(\tau), \bar{s})}{\partial b_k} b_k +$$

$$\delta_{ik} \frac{\partial TE_i(\beta_i(\tau), \tau\beta_{-i}(\tau), \bar{s})}{\partial b_i} b_i$$

and $$c^i =$$

$$-\sum_k \tau(1 - \delta_{ik}) \sum_{j \neq i} \frac{\partial^2 EU_i(\beta_i(\tau), \tau\beta_{-i}(\tau), \bar{s})}{\partial b_j \partial b_k} b_j b_k +$$

$$(1 - \delta_{ik}) v_i \frac{\partial Q_i(\beta_i(\tau), \tau\beta_{-i}(\tau), \bar{s})}{\partial b_k} b_k$$

We make an inverse transformation and express the system of equations of interest in the form $$A(b,\tau)b = c(b,\tau).$$

where the elements of matrix A (b, $\tau$) can be computed as $A_{1k}(b, \tau) = a_k^i$. We know that the original system of non-linear equations has the solution $\beta(0) = 0$ corresponding to the point $\tau = 0$. We solve the problem by constructing a grid over $\tau \in [0,1]$ and choosing the tolerance level $\Delta$ accordingly to the step of the grid. The set of grid point is $\{\tau_N\}_{t-1}^T$ where $$\Delta = \max_{t=2,\ldots,T} \|\tau_N - \tau_{t-1}\|.$$

The solution at each grid point $\tau_N$ will be a vector of bids $b_t$. Then we can use the modified Euler integration scheme to compute the solution on the extended interval. We can note that the system of differential equation has a singularity of order one at the origin.

We use a simple regularization scheme which allows us to avoid the singularity at a cost of an additional approximation error of order $\Delta^\alpha$, where $\alpha$ is the power such that $$\lim_{\delta \to +0} \delta^{-\alpha} \frac{\partial^2 EU_i(b_i, b_{-i})}{\partial b_i \partial b_j}\bigg|_{\|b\|=\delta} < \infty$$

for all i. Note that this condition is satisfied if the Hessian matrix of the payoff function is non-degenerate at the origin. We initialize the system at $b_0 = \Delta/4$ and make a preliminary inverse Euler step by solving $$b_{1/2} = b_0 + A(b_{1/2}, \Delta/2)^{-1} c(b_{1/2}, \Delta/2) \Delta/2 \quad (G.27)$$

with respect to $b_{1/2}$. Such an inverse step enhances the stability of the algorithm and it will be the most time-consuming part. Then the algorithm proceeds from step t to step t+1 in the steps of 1/2. Suppose that $b_t$ is the solution at step t. Then we make a preliminary Euler step $$b_{t+1/2} = b_t + \frac{\Delta}{2} A(b_t, \tau_N)^{-1} c(b_t, \tau_N). \quad (G.\ 28)$$

Then using this preliminary solution we make the final step $$b_{t+1} = b_t + \Delta A\left(b_{t+1/2}, \tau_N + \frac{1}{2}\Delta\right)^{-1} c\left(b_{t+1/2}, \tau_N + \frac{1}{2}\Delta\right).$$

Note that the values that are updated only influence the evaluated derivative, while the final step size is still equal to $\Delta$. We can use standard numerical derivative approximation to compute the elements of A (b,$\tau$) and c (b, $\tau$). For the first derivative we use the third-order formula such that $$\frac{\partial EU_i(b, \tau, \bar{s})}{\partial b_j} = \frac{EU_i(b_j - 2\delta, b_{-j}, \tau, \bar{s}) - 8EU_i(b_j - \delta, b_{-j}, \tau, \bar{s}) + 8EU_i(b_j + \delta, b_{-j}, \tau, \bar{s}) - EU_i(b_j + 2\delta, b_{-j}, \tau, \bar{s})}{12\delta} + o(\delta^3),$$

where $\delta$ is the step size in the domain of bids. For the second cross-derivatives we can use the "diamond" formula $$\frac{\partial^2 EU_i(b,\tau)}{\partial b_j \partial b_k} = \frac{1}{12\delta^2}[EU_i(b_j - 2\delta, b_{-j}, \tau, \bar{s}) - EU_i(b_k - 2\delta, b_{-k}, \tau, \bar{s}) -$$
$$8EU_i(b_j - \delta, b_{-j}, \tau, \bar{s}) + 8EU_i(b_k - \delta, b_{-k}, \tau, \bar{s}) +$$
$$8EU_i(b_j + \delta, b_{-j}, \tau, \bar{s}) - 8EU_i(b_k + \delta, b_{-k}, \tau, \bar{s}) -$$
$$EU_i(b_j + 2\delta, b_{-j}, \tau, \bar{s}) + EU_i(b_k + 2\delta, b_{-k}, \tau, \bar{s})] + o(\delta^4),$$

Then the order of approximation error on the right-hand side is $o(\delta^4)$. For stability of the computational algorithm it is necessary that $\delta^4 = o(\Delta)$. This can be achieved even if one chooses $\delta = \Delta$ (up to scale of the grid). This condition becomes essential if in the sample the function $EU_i$ is not smooth. In that case the minimal step size $\delta$ is determined by the granularity of the support of the payoff function. The step size for $\tau$ should be chosen appropriately and cannot be too small to avoid the accumulation of numerical error.

Initialization of the system simplifies when the auction has a reserve price. When the reserve price is equal to r, then both the expected utility and the total expenditure become functions of r. Homogeneity of the utility function will also be preserved when we consider the vector of bids accompanied by $\tau$. As a result, the system of equilibrium equations will take the form $$\frac{\partial}{\partial b^i} EU(b, \bar{s}, r)b + \frac{\partial}{\partial r} EU(b, \bar{s}, r)r = -TE(b, \bar{s}, r). \quad (G.\ 29)$$

As a result, we can re-write our main result as $$\frac{d}{d\tau} EU_i(b_i, \tau b_{-i}, \bar{s})\bigg|_{\tau=1} = -TE_i(b, \bar{s}) - r\frac{\partial}{\partial r} EU_i(b, \bar{s}, r). \quad (G.\ 30)$$

Our results for $\tau$ in the neighborhood of $\tau = 1$ will apply with total expenditure function corrected by the influence of the reserve price. In the case where the vector of the payoff functions has a non-singular Jacobi matrix globally in the support of bids, we can also extend the results for $\tau \in [0,1]$ to the case with the reserve price. In this case, the initial condition for $\tau = 0$ will solve $$-TE_i(b_i(0), 0, \bar{s}) - r\frac{\partial}{\partial r} EU_i(b_i(0), 0, \bar{s}, r) = 0.$$

Note that for all bidders i=1, . . . , N this is a non-linear equation with a scalar argument $b_i(0)$, which can be solved numerically. This will allow us to construct a starting value for the system of differential equations. Note that in this case equilibrium computations simplify because there is no need in the "inverse" Euler step which we used to stabilize the system of differential equations at the origin. The algorithm will start from the standard preliminary Euler step $\frac{1}{2}\Delta$.

Figure 4:
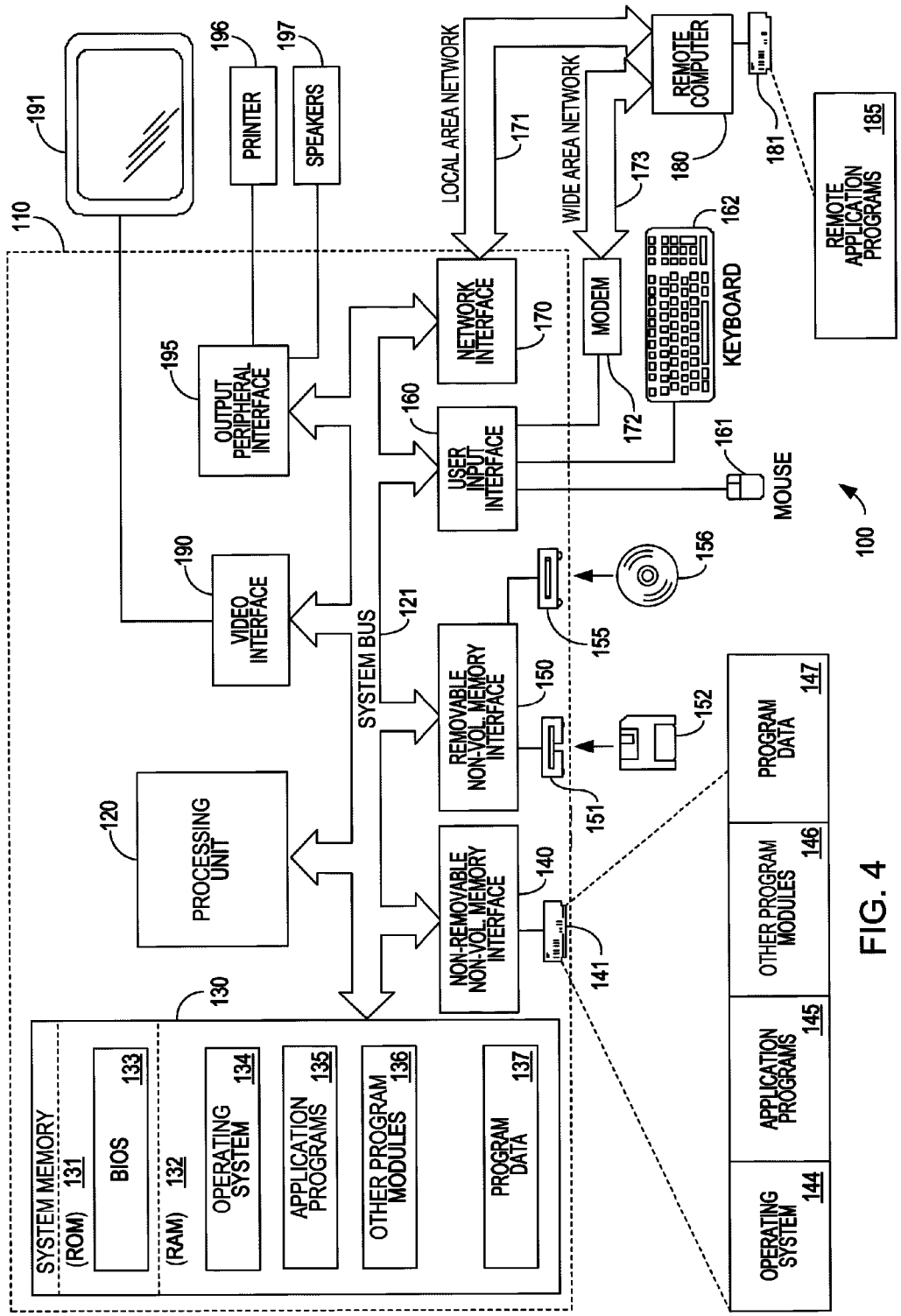
FIG. 4 is a block diagram of a computing environment in which a tool as described herein may operate.

Based on the foregoing, a computing environment may be programmed to compute valuations and equilibria in an auction conducted by an auctioneer (e.g. an advertising platform). FIG. 4 illustrates one such computing environment. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example a tool for simulating generalized second price auctions has been described in connection with auctions for advertising spaces. The tools and techniques described herein may be applicable in other contexts in which such auctions are conducted.

As an example of another possible variation, a specific technique for predicting a value per click has been described, but other techniques may also be used. For example, a coarse approximation of the value can be made by assuming that each advertiser places a bid—though less than the value—is related to the value. As a specific example, the value per click to each advertiser may be computed in some embodiments as a multiple of the advertiser's bid. Accordingly, in some embodiments, the value per click may be computed as twice or three times the bid for that advertiser.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Through, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of predicting operation of an advertising platform that uses auctions to select advertisements for an ad space following changes to the auction parameters, the method comprising:
   with at least one processor:
     computing, based on historical data, a value per click for each of a plurality of advertisers participating in an auction for the ad space;
     receiving new auction parameters; and
     computing predicted equilibrium bids for a plurality of the advertisers participating in the auction for the ad space based on the new auction parameters, the computing being based on a computed solution, representing an equilibrium, for a generalized second price auction, the computed solution being based on the computed values per click, the computing based on a computation that reflects bids by the plurality of advertisers applied over multiple auction cycles.

2. The method of claim 1, wherein:
   the advertising platform assigns quality scores to each of the plurality of advertisers; and
   computing predicted equilibrium bids comprises computing with a computation that reflects uncertainty by each of the plurality of advertisers concerning quality scores assigned to other advertisers.

3. The method of claim 1, further comprising generating an output comprising at least one predicted characteristic of the auction under the new auction parameters, the at least one predicted characteristic being based on the predicted equilibrium bids.

4. The method of claim 1, wherein:
   computing predicted equilibrium bids comprises computing with a computation that reflects quality scores that vary between auctions.

5. The method of claim 1, wherein:
   computing predicted equilibrium bids comprises computing with a computation that reflects uncertainty by each of the plurality of advertisers concerning the rank of their bid with respect to others of the plurality of advertisers.

6. The method of claim 1, wherein computing the value per click comprises computing value to each advertiser based on prior bids by the advertiser.

7. The method of claim 1, wherein the new auction parameters comprise a new pricing model for the auction.

8. The method of claim 1, wherein computing predicted equilibrium bids comprises computing using a homotopy algorithm.

9. The method of claim 1, further comprising:

based on the computed equilibrium, outputting an indication of a number of expected clicks on an advertisement in the ad space for an advertiser and an expected cost for the advertiser for placement of advertisements in the ad space.

10. At least one computer-readable storage medium comprising computer-executable instructions that, when executed by at least one process processor, perform a method comprising:

computing, based on historical data, a value per click for each of a plurality of advertisers participating in an auction for an ad space made available by an advertising platform;

receiving new auction parameters; and computing predicted equilibrium bids for a plurality of the advertisers participating in the auction for the ad space based on the new auction parameters, the computing being based on a computed solution, representing an equilibrium, for a generalized second price auction, the computed solution being based on the computed values per click; and generating an output comprising at least one predicted characteristic of the auction under the new auction parameters based on the predicted equilibrium bids and comprising a projection of a sharing of revenue between the advertising platform and each of the plurality of advertisers.

11. The at least one computer-readable storage medium of claim 10, wherein:

the received auction parameters comprise an auction reserve.

12. The at least one computer-readable storage medium of claim 10, wherein:

the received auction parameters comprise a pricing model for the auction.

13. The at least one computer-readable storage medium of claim 10, wherein:

computing predicted equilibrium bids comprises computing with a computation that reflects bids by each of the plurality of advertisers that are applied for a number of auction cycles, the number of auction cycles indicating a number of times that the advertising platform renders an advertisement during a period in excess of four hours.

14. The at least one computer-readable storage medium of claim 10, wherein:

generating an output comprises a projection of revenue derived from presentation of advertisements in the ad space.

15. The at least one computer-readable storage medium of claim 10, wherein computing predicted equilibrium bids comprises computing using a homotopy algorithm.

16. A system for use by an advertising platform, the system comprising:

at least one server selecting advertisements for an ad space to render for users, the at least one server selecting the advertisements based on search queries submitted by the users;

a data store comprising historical data relating to historical selection of advertisements for the ad space from each of a plurality of advertisers and a rate of click through on advertisements from each of the plurality of advertisers;

an off-line simulator configured for:

computing, based on the historical data, a value per click for each of the plurality of advertisers;

receiving new auction parameters;

computing predicted equilibrium bids for a plurality of the advertisers participating in the auction for the ad space based on the new auction parameters, the computing being based on a computed solution, representing an equilibrium, for a generalized second price auction, the computed solution being based on the computed values per click; and generating an output comprising a projection of a sharing of revenue between the advertising platform and each of the plurality of advertisers.

17. The system of claim 16, wherein:

the offline simulator computes predicted equilibrium bids with a computation that reflects uncertainty by each of the plurality of advertisers concerning quality scores assigned to other advertisers.

18. The system of claim 17, wherein:

the offline simulator computes predicted equilibrium bids with a computation that reflects bids by each of the plurality of advertisers that are applied for multiple auction cycles.

19. The system of claim 18, wherein:

the offline simulator generates an output that further comprises a projection of revenue derived from presentation of advertisements in the ad space.

20. The system of claim 19, wherein computing predicted equilibrium bids comprises computing with a computation that reflects quality scores that vary between auctions.

* * * * *